United States Patent
Shuey

(10) Patent No.: US 7,486,056 B2
(45) Date of Patent: Feb. 3, 2009

(54) INPUT CURRENT OR VOLTAGE LIMITED POWER SUPPLY

(75) Inventor: Kenneth C. Shuey, Zebulon, NC (US)

(73) Assignee: Elster Electricity, LLC, Raleigh, NC (US)

( * ) Notice: Subject to any disclaimer, the term of this patent is extended or adjusted under 35 U.S.C. 154(b) by 260 days.

(21) Appl. No.: 11/559,954

(22) Filed: Nov. 15, 2006

(65) Prior Publication Data

US 2008/0111526 A1 May 15, 2008

(51) Int. Cl.
*G05F 1/577* (2006.01)
*H02J 11/00* (2006.01)
(52) U.S. Cl. .................. 323/266; 307/35; 323/299
(58) Field of Classification Search .......... 323/225, 323/266, 267, 268, 284, 299, 303; 307/11, 307/12, 31, 35; 363/125
See application file for complete search history.

(56) References Cited

U.S. PATENT DOCUMENTS

| | | | | |
|---|---|---|---|---|
| 5,404,092 A | * | 4/1995 | Gegner | 323/207 |
| 5,457,621 A | | 10/1995 | Munday et al. | 363/56 |
| 6,118,677 A | * | 9/2000 | Ameri | 363/37 |
| 7,173,400 B2 | * | 2/2007 | Morioka | 323/266 |
| 7,298,120 B2 | * | 11/2007 | Lam | 323/272 |
| 7,317,301 B2 | * | 1/2008 | Angquist | 323/208 |

* cited by examiner

*Primary Examiner*—Gary L Laxton
(74) *Attorney, Agent, or Firm*—Woodcock Washburn LLP

(57) ABSTRACT

An apparatus comprises a linear power supply and an auxiliary power supply powered from the linear power supply. The auxiliary power supply comprises a switching regulator connected to receive, at an input thereof, the output voltage of the linear power supply and to generate therefrom an output voltage of the auxiliary power supply. The auxiliary power supply further comprises a detection circuit, connected to the linear power supply and to the switching regulator, that detects one of (i) a level of current drawn from the linear power supply and (ii) a level of voltage at an output of the linear power supply and that causes the switching regulator to reduce its load on the linear power supply when the detected level reaches a predetermined threshold.

23 Claims, 3 Drawing Sheets

INPUT CURRENT OR VOLTAGE LIMITED POWER SUPPLY

FIELD OF THE INVENTION

The present invention relates to power supplies.

BACKGROUND

Power supplies are used in a wide variety of applications. A power supply typically receives an input voltage and produces from it an output voltage that is then used to power other electronic components. For example, a power supply may receive an alternating current (AC) input voltage and produce from it a direct current (DC) output voltage that is used to power various integrated circuits and other electronic components. One application in which a power supply is used is electronic metering of electrical energy.

Electronic metering of electrical energy is a maturing technology, and it is desirable to minimize the hardware costs of electronic, electrical energy meters to remain price competitive in the market for such meters. Typically, one of the major cost elements in such a meter is the power supply that develops DC voltage for the various different circuit components within the meter.

The power supply in an electronic, electrical energy meter typically receives the AC line voltage as its input and provides a lower voltage DC output (e.g., 5 or 12 volts DC) that is used to power the internal electronic components of the meter. In higher-end, poly-phase electronic meters, the power supply is typically an off-line switching regulator that can operate over a variety of different AC input voltages. An example of such an off-line switching regulator is described in U.S. Pat. No. 5,457,621. Less complex, single-phase electronic meters typically employ dedicated voltage, linear power supplies.

Today's electronic meters, both poly-phase and single-phase, typically also incorporate wireless communication circuitry. These communication circuits can put a heavy short-term current requirement on the meter power supply during transmit. Many systems are incorporating super-capacitor storage devices to provide the short-term current overloads.

The variable input voltage, off-line switching power supplies employed in higher-end poly-phase electronic meters typically can deliver a high dynamic range of output energy that is sufficient to power wireless communication circuitry. Where short term capacitor storage is needed to assist transmitter current needs, recharge of the capacitors can normally be handled by the off-line supply.

In electronic meters with linear power supplies, the combination of high transmit current requirements for wireless communication and high charge current requirements for storage devices can negatively impact the linear power supply output voltage. With a linear power supply, there typically is not much excess energy available above nominal operating requirements. Wireless communication transmit currents must be delivered by super-capacitor storage devices, but recharge of the super-capacitors is normally restricted to a quasi-trickle charge. The resulting long recharge time can negatively impact the communication performance of the system.

Consequently, there is a need for a power supply design that enables maximum current or voltage draw from a linear power supply to power auxiliary functions, such as wireless communications and/or charging of a super-capacitor, without impacting the ability of the linear power supply to serve its primary power supply functions.

SUMMARY

An apparatus comprises a linear power supply and an auxiliary power supply powered from the linear power supply. The linear power supply may be used to power first circuitry, and the auxiliary power supply may be used to power second circuitry. The auxiliary power supply comprises a switching regulator connected to receive, at an input thereof, the output voltage of the linear power supply and to generate therefrom an output voltage of the auxiliary power supply. The auxiliary power supply further comprises a detection circuit, connected to the linear power supply and to the switching regulator, that detects one of (i) a level of current drawn from the linear power supply and (ii) a level of voltage at an output of the linear power supply, and that causes the switching regulator to reduce its load on the linear power supply when the detected level reaches a predetermined threshold.

In one embodiment, the detection circuit comprises a comparator that compares a measure of the level of current drawn from the linear power supply to a threshold value, and when the measure of the level of current exceeds the threshold value, produces an output signal indicative thereof. In one embodiment, the threshold value may be time-varying, for example, it may follow a full-wave rectified waveform. In another embodiment, the detection circuit comprises a comparator that compares a measure of the level of voltage of the output of the linear power supply to a threshold value, and when the measure of the level of voltage falls below the threshold value, produces an output signal indicative thereof. In either embodiment, the output signal generated by the comparator may be used to override a feedback input of the switching regulator. During normal operation of the switching regulator, the feedback input receives the output voltage of the switching regulator so that it can regulate the output voltage to a desired level. But when the detected level of current or voltage at the output of the linear power supply reaches the threshold value, the output signal of the comparator overrides the feedback input with a voltage that causes the switching regulator to react as if the output voltage of the switching regulator is too high. This, in turn, reduces the load of the switching regulator on the linear power supply, preventing too much current or voltage draw on the output of the linear power supply.

A method of operating an auxiliary power supply that comprises a switching regulator connected to receive, at an input thereof, an output voltage of a linear power supply and to generate therefrom an output voltage of the auxiliary power supply, is also disclosed. The method comprises detecting one of (i) a level of current drawn from the linear power supply by the switching regulator and (ii) a level of voltage at an output of the linear power supply; and causing the switching regulator to reduce its load on the linear power supply when the detected level reaches a predetermined threshold. In one embodiment, the detecting step comprises detecting a level of current drawn from the linear power supply by the switching regulator, and the causing step comprises causing the switching regulator to reduce its load on the linear power supply when the detected level rises above the predetermined threshold. In another embodiment, the detecting step comprises detecting a level of voltage at the output of the linear power supply, and the causing step comprises causing the switching regulator to reduce its load on the linear power supply when the detected level falls below the predetermined threshold. Where the switching regulator has a feedback input that receives a measure of the output voltage of the auxiliary power supply so that the switching regulator can regulate the output voltage to a desired level, the causing step may comprise overriding the feedback input of the switching regulator to cause the switching regulator to react as if the output voltage of the auxiliary power supply is too high.

DETAILED DESCRIPTION

Figure 1:
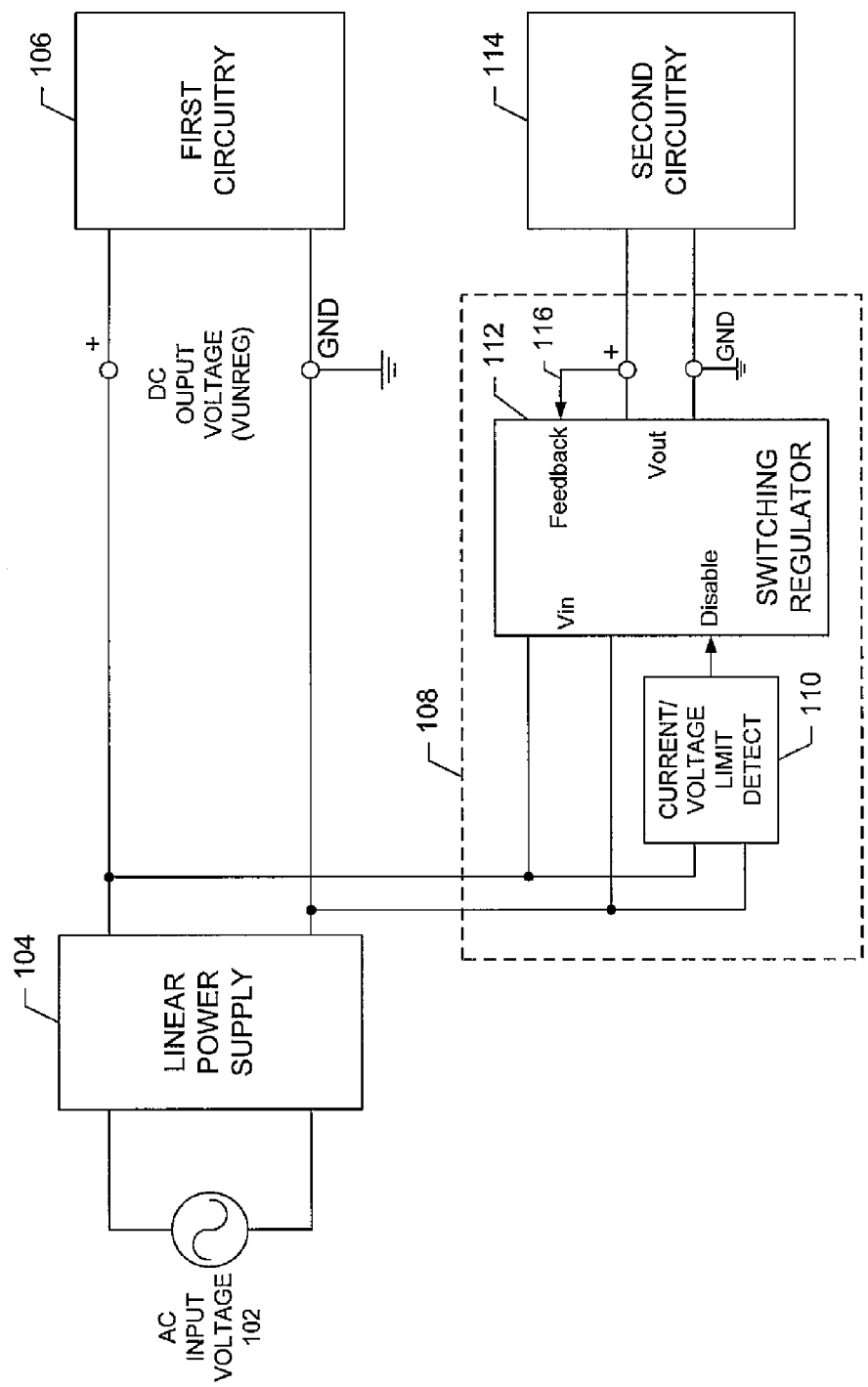
FIG. 1 is a block diagram of one embodiment of an apparatus comprising a linear power supply and an auxiliary power supply.

FIG. 1 is a block diagram of one embodiment of an apparatus 100. As shown, the apparatus comprises a first, linear power supply 104 that receives an alternating current (AC) input voltage 102 and produces therefrom a direct current (DC) output voltage (Vunreg). Any linear power supply topology may be used to implement the linear power supply 104. In one embodiment, the linear power supply comprises a linear transformer that receives the AC input voltage and produces a desired output voltage, a full-wave diode bridge rectifier that rectifies the linear transformer output voltage, and an output filter capacitor. In one embodiment, the linear supply develops anywhere from 10-15 volts DC, depending on the AC input voltage to the transformer. In one embodiment, the transformer is designed with high secondary winding impedance to help limit output voltage and to reduce secondary current from input surge voltage conditions.

The DC output voltage of the linear power supply 104 may be utilized to provide power to first circuitry 106. First circuitry 106 may comprise any electronic circuitry that requires power from a DC power source such as the output of the linear power supply 104. For example, when embodied in an electronic, electrical energy meter, the first circuitry 106 may comprise electronic circuitry for measuring energy consumption such as, for example, the electronic circuitry disclosed in U.S. Pat. No. 5,457,621. It is understood, however, that the power supply apparatus 100 is not limited to use in any particular application, but rather may be used to power any form of first circuitry 106.

The power supply apparatus 100 further comprises an auxiliary power supply 108 that receives, as its input voltage, the DC output voltage of the linear power supply and produces therefrom its own DC output voltage. In one embodiment, the DC output voltage of the auxiliary power supply 108 is less than the DC output voltage of the linear power supply 104. In other embodiments, the DC output voltage of the auxiliary power supply 108 may be greater than the DC output voltage of the linear power supply 104.

The DC output voltage of the auxiliary power supply 108 may be used to power second circuitry 114. Second circuitry 114 may comprise any electronic circuitry that requires power from a DC power source such as the output of the auxiliary power supply 108. For example, when embodied in an electronic, electrical energy meter, the second circuitry 114 may comprise wireless communications circuitry and/or one or more super-capacitors.

In the embodiment illustrated in FIG. 1, the auxiliary power supply 108 comprises a switching regulator 112 connected to receive, at an input thereof (Vin), the output voltage of the linear power supply 104 and to generate therefrom a DC output voltage (Vout) that defines the output voltage of the auxiliary power supply 108. There are a variety of switching regulator topologies, and any form of switching regulator may be used to implement switching regulator 112, including without limitation a buck, boost, buck-boost (inverting) or flyback switching regulator. Typically, a switching regulator uses a switching element, such as a transistor, to control the amount of energy from the input voltage that is applied to an energy storage element, such as a capacitor, transformer or inductor. The duty cycle of the switching element determines the amount of energy that is transferred to the energy storage element. The resulting voltage generated by the energy storage element defines the output voltage of the switching regulator. A feedback circuit within the switching regulator monitors the output voltage (via line 116, for example) and compares it with a reference voltage, which can be manually or electronically set to the desired output voltage. If there is an error in the output voltage, the feedback circuit compensates by adjusting the duty cycle of the switching element to transfer either more or less energy to the energy storage element, as needed, to keep the output voltage at the desired level.

The auxiliary power supply 108 further comprises a detection circuit 110, connected to the linear power supply and to the switching regulator, that detects either (i) a level of current drawn from the linear power supply 108 or (ii) a level of voltage at an output of the linear power supply. When the detected current or voltage level reaches a threshold value, such as a maximum current or minimum voltage, the detection circuit 110 operates to reduce the load by the switching regulator on the linear power supply output. This can be accomplished by either disabling the switching regulator or adjusting the duty cycle of the switching element within the regulator so that it draws less current or voltage from the linear power supply. To disable the switching regulator 112, the detection circuit 110 may, for example, provide a signal to a "disable" input of the switching regulator that causes the switching regulator to shut down. Alternatively, the detection circuit 110 may be connected to override or drive the feedback signal (e.g., the signal on line 116) to the switching regulator to make the feedback voltage appear higher than the desired output voltage, thereby causing the switching regulator to reduce the duty cycle of the switching element and, hence, reduce the current or voltage drawn from the linear power supply output.

By reducing the load on the linear power supply when the current or voltage draw reaches a threshold level, the auxiliary power supply can provide power to the second circuitry 114 in a manner that does not overburden the linear power supply.

Figure 2:
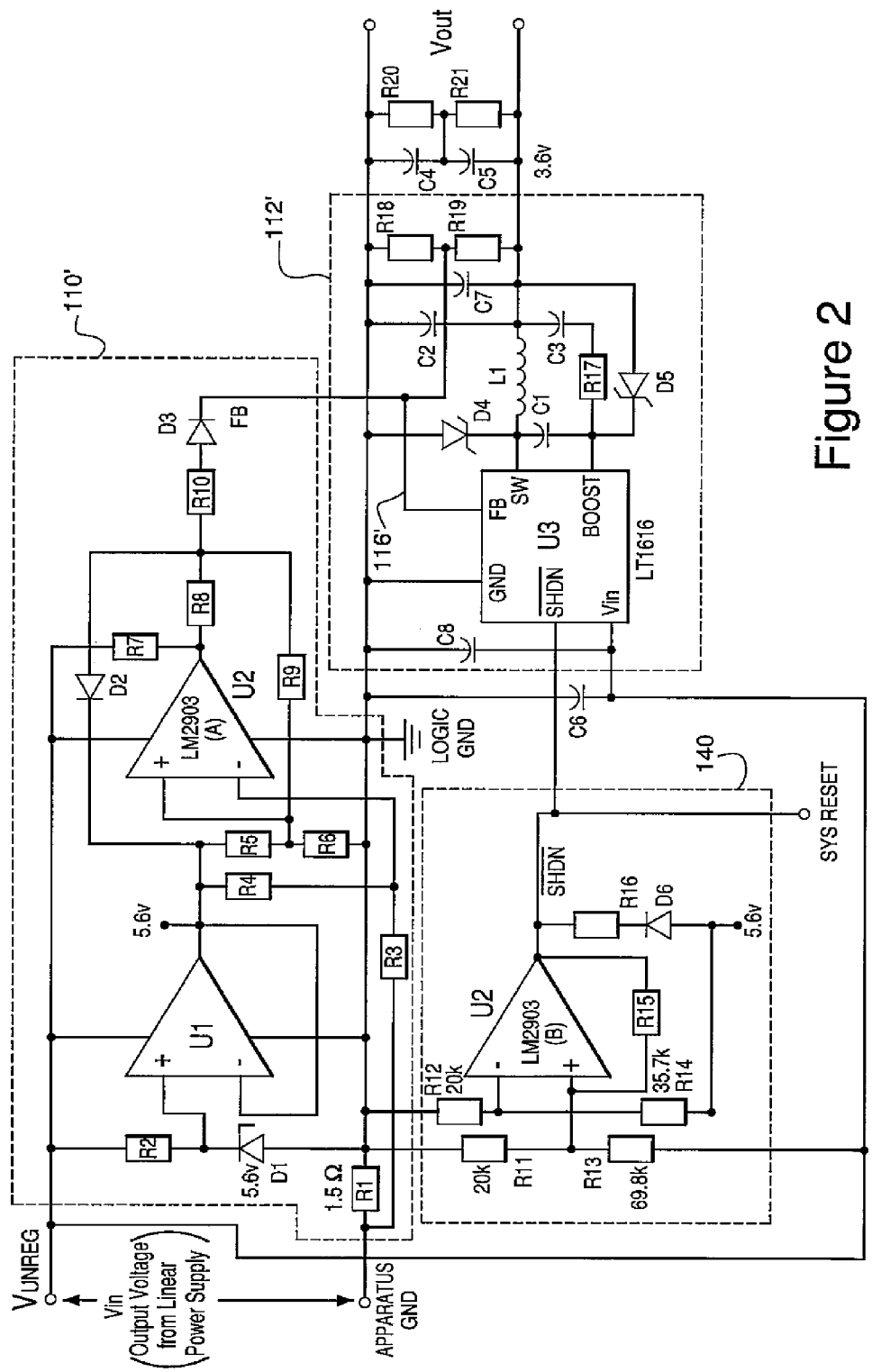
FIG. 2 is a diagram illustrating further details of one embodiment of an auxiliary power supply.

FIG. 2 is a diagram illustrating further details of the auxiliary power supply 108 in accordance with one embodiment of the present invention. In this embodiment, the switching regulator 112' comprises a conventional buck-type switching regulator. The switching element and control functions of the regulator are implemented using an LT1616 integrated circuit manufactured by Linear Technology Corporation (U3). The input voltage to the switching regulator (Vin) (which is the output voltage of the linear power supply 104) is applied to the Vin input of U3. The energy storage element comprises an inductor (L1) that is energized by the "SW" output of U3. The output voltage (Vout) of the switching regulator is fed back to the "FB" input of U3 via line 116. In this example embodiment, the switching regulator develops a regulated output voltage of 3.6 volts DC and operates at approximately 80% efficiency over the full range of DC input voltage.

As further shown, in this example embodiment, the second circuitry 114 that receives the output voltage (Vout) of the switching regulator 112' may comprise two super-capacitors, C4 and C5, and related resistors R20 and R21. Of course, as mentioned above, the second circuitry 114 can comprise other circuitry as well, such as, for example, wireless communication circuitry. The super-capacitors (C4, C5) can be used to provide short-term energy assistance to such other second circuitry, and the switching regulator 112', together with the detection circuit 110' described below, can allow the super-capacitors to recharge as rapidly as the linear power supply 104 will allow.

In the embodiment shown in FIG. 2, the detection circuit 110' comprises comparators U1 and U2(A) and associated resistors R1-R10 and diodes D1, D2 and D3. This detection circuit 110' detects the level of current drawn from the linear power supply 104 and, when the detected current level reaches a threshold (e.g., maximum) value, the detection circuit 110' operates to reduce the current drawn by the switching regulator.

In greater detail, comparator U1 is configured as a unity gain follower. U1 buffers the D1 zener voltage to create a low impedance voltage reference which, in this embodiment, is approximately 5.6 volts. In other embodiments, the reference voltage may be different. In this embodiment, the 5.6 volt value was chosen because it is much lower than the normal value of the output voltage of the linear power supply (e.g., 10-15 volts), and zener diodes in the range of 5.6 volts are relatively temperature stable.

Comparator U2(A) senses the difference between a reference voltage (at R5, R6) and the current input (at R3, R4). The magnitude of the reference voltage, and hence the threshold value of the current detected by the circuit 110', is determined by the values of resistors R5 and R6. Thus, the reference voltage can be adjusted by changing resistor values. In one embodiment, the threshold current value may be 70 milliamps (ma). In other embodiments, the threshold may be different. When the current through sense resistor R1 exceeds the threshold (e.g., 70 ma), the voltage at "Apparatus Gnd" will cause the voltage at R3, R4 to go below the reference at R5, R6. This causes the output of U2(A) to go high. When the output of U2(A) goes high, the feedback signal on line 116, which is input to the feedback input (FB) of U3, is driven above the sense level (i.e., the voltage level that represents the desired output voltage of the switching power supply), making the switching regulator think its output voltage is too high. In this embodiment, the switching regulator responds by ceasing to pull, or reducing the pull of, current from the linear power supply 104. That is, the switching regulator reduces its load on the linear power supply. As the current drawn from the linear power supply 104 decreases (current through R1), the reference voltage at U2(A) (+) goes below the current signal at U2(A)(−) and the output of U2(A) switches low—thus no longer overdriving the feedback signal on line 116. With the U2(A) output low, diode D3 isolates the U2(A) output from the switching regulator and the switching regulator returns to its normal control loop operation.

Thus, in this specific embodiment, the switching regulator 112' is allowed to operate normally to develop a regulated 3.6 volt output voltage as long as the linear power supply 104 output current draw is less than 70 ma. When the loading on the regulated output of the switching supply requires more than 70 ma from the linear power supply 104, the current limit detection circuit 110' operates to reduce the current draw by the switching regulator. The super-capacitors (C4, C5) at the output will provide short-term assistance to any other second circuitry 114 and the switching regulator 112' will allow the super-capacitors to recharge as rapidly as the linear supply will allow. It is understood, however, that the voltage values, current values, and threshold values implemented in this embodiment are merely examples and that in other applications these values may be different.

In another embodiment, the threshold value may be time-varying. For example, R5 may be connected to a full-wave rectified voltage source, such as the unfiltered output of the linear power supply, rather than the constant 5.6 volt reference of the circuit shown in FIG. 2. In such a case, the resulting threshold value will be a time-varying full wave rectified value rather than a constant value. The output of U2(A) would then respond to the input current in comparison to the time-varying full-wave rectified threshold, such that the auxiliary power supply draws a full-wave rectified current from the linear supply. In this embodiment, the linear power supply may be unfiltered or very lightly filtered, and the auxiliary power supply will pull current from the linear supply in a manner that matches the linear supply output voltage. In certain situations, drawing such full-wave rectified current may be advantageous.

Still referring to FIG. 2, in one embodiment, the auxiliary power supply 108 further comprises a second detection circuit 140 that detects a level of voltage at the output of the linear power supply and that prevents the switching regulator from starting until the detected level of voltage rises to a predetermined threshold. In this example embodiment, the second detection circuit 140 comprises comparator U2(B) (which may be implemented by the second half of an LM2903 integrated circuit available from National Semiconductor Corporation) and associated resistors R11-R16 and diode D6. The output of comparator U2(B) prevents the switching regulator 108 from operating during startup conditions until the output of the linear power supply 104 reaches the threshold voltage (approximately 9 volts DC in this example) close to its normal operating voltage. This prevents the switching regulator from starting prematurely.

In greater detail, U2(B) is configured as a comparator with hysteresis. U2(B) senses the input voltage to the auxiliary power supply (i.e., the output voltage ("Vunreg") of the linear power supply) through resistors R11 and R13. This input voltage is compared to a voltage set by R12 and R14 off the 5.6 volt reference. When the input voltage gets above the reference (approximately 9 volts in this example), the output of U2(B) goes high (drives the SHDN pin of U3) and allows U3 to operate normally.

Figure 3:
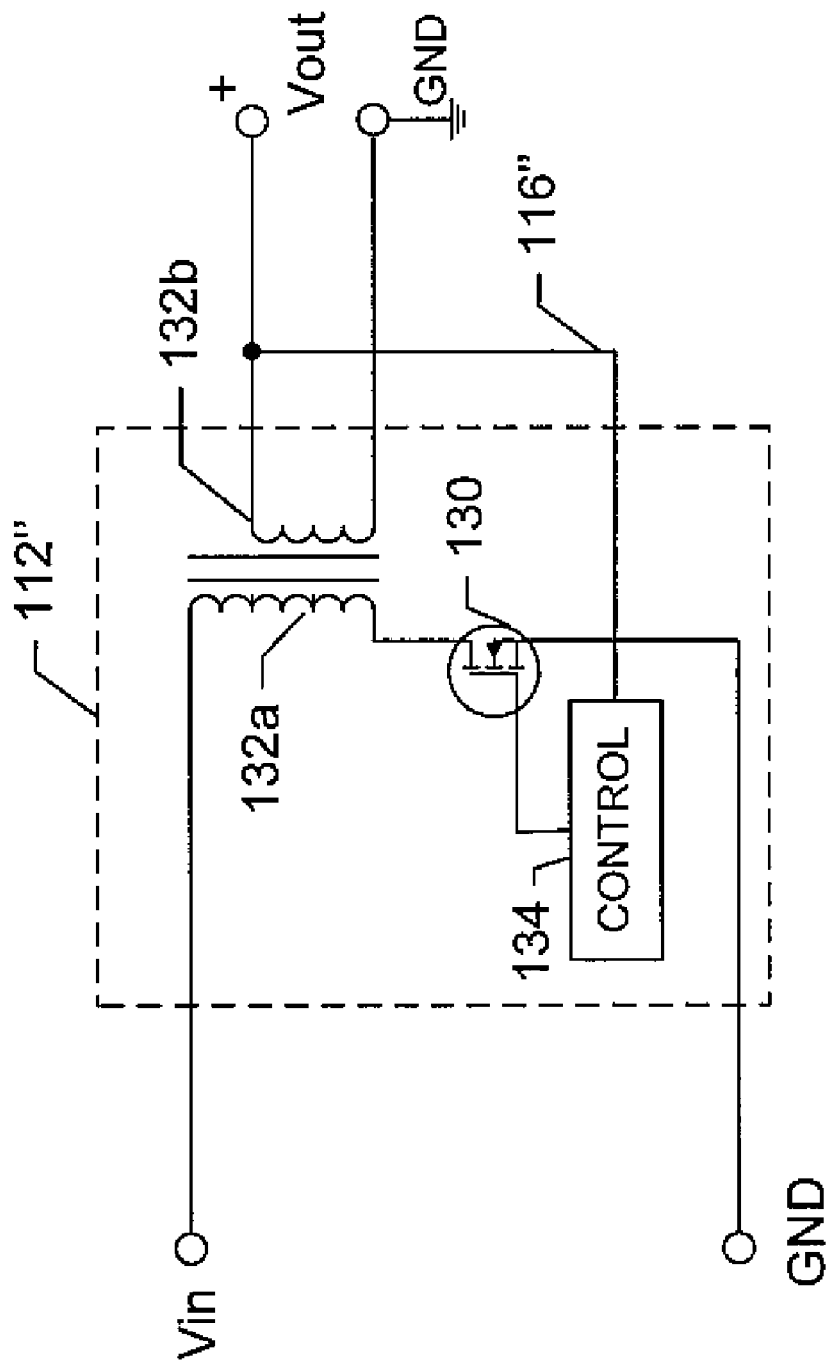
FIG. 3 is a diagram illustrating an alternative embodiment of a switching regulator.

FIG. 3 is a diagram illustrating an alternative embodiment of a switching regulator 112". In this embodiment, the switching regulator comprises a flyback switching regulator. A switching element 130, which may comprises a transistor, switches current through the primary winding 132a of a transformer on and off in accordance with a duty cycle determined by control circuitry 134. When current is flowing through the primary winding, energy builds up in the primary winding. When the current in the primary winding is switched off, energy transfers to the secondary winding and the resulting voltage across the secondary winding defines the output voltage of the switching regulator. A measure of the output voltage on the secondary winding is fed back to the control circuitry 134 of the switching regulator via line 116". By controlling the duty cycle of the switching element 130, the control circuitry is able to control the amount of energy transferred from the primary winding to the secondary winding and, hence, the output voltage on the secondary winding. The control circuit will adjust the duty cycle of the switching element, as needed, to maintain the output voltage at the desired level.

In an alternative embodiment of the auxiliary power supply, the current limit detection circuit 110' shown in FIG. 2 is replaced with an undervoltage limit detection circuit that detects the voltage level of the output of the linear power supply 104 and causes the switching regulator to reduce its load on the voltage of the linear power supply 104 when the detected voltage level reaches a predetermined threshold (i.e., falls below a predetermined voltage). Thus, in this alternative embodiment, the DC output voltage of the linear power supply is monitored and the switching regulator is allowed to operate normally until the output voltage of the linear power supply falls below the threshold value (10 volts for example). As in the case of the current limit detection circuit 110', when the linear power supply output falls to the threshold value, the feedback signal 116' to the switching regulator 112' will be driven positive, again making the regulator think its output voltage is too high, causing the switching regulator to stop running. By monitoring the linear power supply's voltage rather than its current, the maximum energy of the linear power supply's transformer can be utilized over the AC input voltage range. This may work the transformer harder, but by proper selection of secondary winding impedance and voltage set-point, safe operation can be achieved at high output power while not impacting the first circuitry 106 that also is operating from the linear power supply 104.

The foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims.

What is claimed:

1. An auxiliary power supply powered from a linear power supply, the auxiliary power supply comprising:
   a switching regulator connected to receive, at an input thereof, an output voltage of the linear power supply and to generate therefrom an output voltage of the auxiliary power supply; and
   a detection circuit, connected to the linear power supply and to the switching regulator, that detects one of (i) a level of current drawn from the linear power supply and (ii) a level of voltage at an output of the linear power supply and that causes the switching regulator to reduce its load on the linear power supply when the detected level reaches a predetermined threshold.

2. The auxiliary power supply recited in claim 1, further comprising:
   a second detection circuit, connected to the linear power supply and to the switching regulator, that detects a level of voltage at the output of the linear power supply and that prevents the switching regulator from starting until the detected level of voltage rises to a predetermined threshold.

3. The auxiliary power supply recited in claim 1, further comprising at least one super-capacitor that is connected to the switching regulator and that is charged from the output voltage of the auxiliary power supply.

4. The auxiliary power supply recited in claim 1, wherein the detection circuit comprises a comparator that compares a measure of the level of current drawn from the linear power supply to a threshold value, and when the measure of the level of current exceeds the threshold value, produces an output signal indicative thereof.

5. The auxiliary power supply recited in claim 4, wherein a feedback input of the switching regulator receives a measure of the output voltage of the switching regulator so that the switching regulator can regulate the output voltage to a desired level, and wherein when the measure of the level of current drawn from the linear power supply exceeds the threshold value, the output signal generated by the comparator overrides the feedback input of the switching regulator with a voltage that causes the switching regulator to react as if the output voltage of the switching regulator is too high.

6. The auxiliary power supply recited in claim 1, wherein the detection circuit comprises a comparator that compares a measure of the level of voltage of the output of the linear power supply to a threshold value, and when the measure of the level of voltage falls below the threshold value, produces an output signal indicative thereof.

7. The auxiliary power supply recited in claim 6, wherein a feedback input of the switching regulator receives a measure of the output voltage of the switching regulator so that the switching regulator can regulate the output voltage to a desired level, and wherein when the measure of the level of voltage of the output of the linear power supply falls below the threshold value, the output signal generated by the comparator overrides the feedback input of the switching regulator with a voltage that causes the switching regulator to react as if the output voltage of the switching regulator is too high.

8. The auxiliary power supply recited in claim 1, wherein the switching regulator comprises one of a buck, boost, buck-boost (inverting) or flyback switching regulator.

9. An apparatus comprising:
   a linear power supply that receives an alternating current (AC) input voltage and produces therefrom a direct current (DC) output voltage; and
   an auxiliary power supply powered from the linear power supply, the auxiliary power supply comprising:
      a switching regulator connected to receive, at an input thereof, the output voltage of the linear power supply and to generate therefrom an output voltage of the auxiliary power supply; and
      a detection circuit, connected to the linear power supply and to the switching regulator, that detects one of (i) a level of current drawn from the linear power supply and (ii) a level of voltage at an output of the linear power supply and that causes the switching regulator to reduce its load on the linear power supply when the detected level reaches a predetermined threshold.

10. The apparatus recited in claim 9, wherein the auxiliary power supply further comprises:
    a second detection circuit, connected to the linear power supply and to the switching regulator, that detects a level of voltage at the output of the linear power supply and that prevents the switching regulator from starting until the detected level of voltage rises to a predetermined threshold.

11. The apparatus recited in claim 9, further comprising at least one super-capacitor that is connected to the switching regulator and that is charged from the output voltage of the auxiliary power supply.

12. The apparatus recited in claim 9, wherein the detection circuit comprises a comparator that compares a measure of the level of current drawn from the linear power supply to a threshold value, and when the measure of the level of current exceeds the threshold value, produces an output signal indicative thereof.

13. The apparatus recited in claim 12, wherein a feedback input of the switching regulator receives a measure of the output voltage of the switching regulator so that the switching regulator can regulate the output voltage to a desired level, and wherein when the measure of the level of current drawn from the linear power supply exceeds the threshold value, the output signal generated by the comparator overrides the feedback input of the switching regulator with a voltage that causes the switching regulator to react as if the output voltage of the switching regulator is too high.

14. The apparatus recited in claim 9, wherein the detection circuit comprises a comparator that compares a measure of the level of voltage of the output of the linear power supply to a threshold value, and when the measure of the level of voltage falls below the threshold value, produces an output signal indicative thereof.

15. The apparatus recited in claim 14, wherein a feedback input of the switching regulator receives a measure of the output voltage of the switching regulator so that the switching regulator can regulate the output voltage to a desired level, and wherein when the measure of the level of voltage of the output of the linear power supply falls below the threshold value, the output signal generated by the comparator overrides the feedback input of the switching regulator with a voltage that causes the switching regulator to react as if the output voltage of the switching regulator is too high.

16. The apparatus recited in claim 9, wherein the switching regulator comprises one of a buck, boost, buck-boost (inverting) or flyback switching regulator.

17. A method of operating an auxiliary power supply that comprises a switching regulator connected to receive, at an input thereof, an output voltage of a linear power supply and to generate therefrom an output voltage of the auxiliary power supply, the method comprising:

detecting one of (i) a level of current drawn from the linear power supply by the switching regulator and (ii) a level of voltage at an output of the linear power supply; and causing the switching regulator to reduce its load on the linear power supply when the detected level reaches a predetermined threshold.

18. The method recited in claim 17, wherein the detecting step comprises detecting a level of current drawn from the linear power supply by the switching regulator, and wherein said causing step comprises causing the switching regulator to reduce its load on the linear power supply when the detected level rises about the predetermined threshold.

19. The method recited in claim 17, wherein the detecting step comprises detecting a level of voltage at the output of the linear power supply, and wherein said causing step comprises causing the switching regulator to reduce its load on the linear power supply when the detected level falls below the predetermined threshold.

20. The method recited in claim 17, wherein the switching regulator has a feedback input that receives a measure of the output voltage of the auxiliary power supply so that the switching regulator can regulate the output voltage to a desired level, and wherein the causing step comprises overriding the feedback input of the switching regulator with a voltage that causes the switching regulator to react as if the output voltage of the auxiliary power supply is too high.

21. The auxiliary power supply recited in claim 1, wherein the threshold value is time-varying.

22. The apparatus recited in claim 9, wherein the threshold value is time-varying.

23. The method recited in claim 17, wherein the threshold value is time-varying.

\* \* \* \* \*